(No Model.)

S. FRANK.
FLEXIBLE METALLIC TUBE.

No. 581,343. Patented Apr. 27, 1897.

Witnesses
J. G. Hinkel
A. E. F. Fansmann

Inventor
Salomon Frank,
by Toulin Freeman
Attorneys.

UNITED STATES PATENT OFFICE.

SALOMON FRANK, OF FRANKFORT-ON-THE-MAIN, GERMANY.

FLEXIBLE METALLIC TUBE.

SPECIFICATION forming part of Letters Patent No. 581,343, dated April 27, 1897.

Application filed September 30, 1896. Serial No. 607,454. (No model.) Patented in Germany March 28, 1894, No. 83,341; in France August 25, 1894, No. 240,983; in England August 25, 1894, No. 16,255; in Belgium August 9, 1895, No. 117,084, and in Switzerland December 2, 1895, No. 11,342.

*To all whom it may concern:*

Be it known that I, SALOMON FRANK, a subject of the Queen of England, and a resident of Frankfort-on-the-Main, Germany, have invented certain new and useful Improvements in Flexible Metallic Tubes, (patented in Germany March 28, 1894, No. 83,341; in France August 25, 1894, No. 240,983; in England August 25, 1894, No. 16,255; in Belgium August 9, 1895, No. 117,084, and in Switzerland December 2, 1895, No. 11,342,) of which the following is a specification.

The production of flexible and tightly-closing metal pipes or tubes has heretofore been tried in two different ways—namely, first, by connecting separate pieces by means of flanging, india-rubber tightening, soldering, and similar methods, and, second, by pressing out of one pipe.

By means of the first-mentioned method more or less flexible pipes are obtained, but such pipes are very expensive and are not reliable as regards tightness of the walls.

Figure 1:
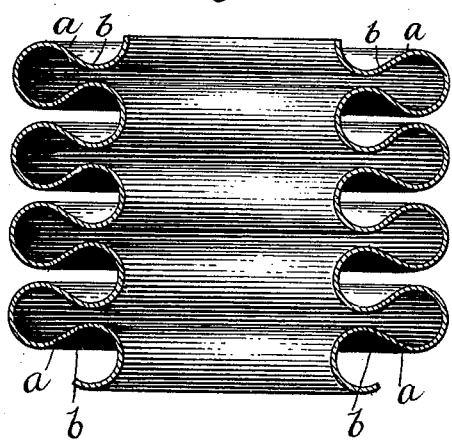

The second method has hitherto only been tried in the manner illustrated in Figure 1 of German Patent No. 41,626, and it is easily seen that such pipes, though fulfilling their purposes as regards tightness, do not possess the desired flexibility when produced in the manner specified. Supposing $r$ to indicate the radius of the inner and outer bulges, the distance measured parallel to the axis of the pipe between the centers of the inner and outer bulges in Fig. 1 of the Patent No. 41,626 is equal to $2r$. In this manner the corrugated sheet plates which have been in use for a long time, especially in the manufacture of boilers, are obtained.

In the construction forming the object of this invention the distance between the centers is always smaller than $2r$—that is to say, the arcs are always larger than semicircles. These circles are connected with one another by transverse pieces which tangentially engage the arcs. As the arcs are larger than semicircles, these transverse pieces will normally be inclined to a certain angle, which is less than a right angle, against the axis of the pipe. The length of these transverse pieces varies considerably, according to requirement, and may decrease to a minimum when the arcs pass almost directly into one another, but in this latter case also the tangent at the transition from one arc into the other will be inclined with respect to the axis of the pipe. It is only owing to this fact that the pipes receive the desired flexibility, fulfilling at the same time the other important requirement—namely, that of a perfect tight closure.

Figure 2:
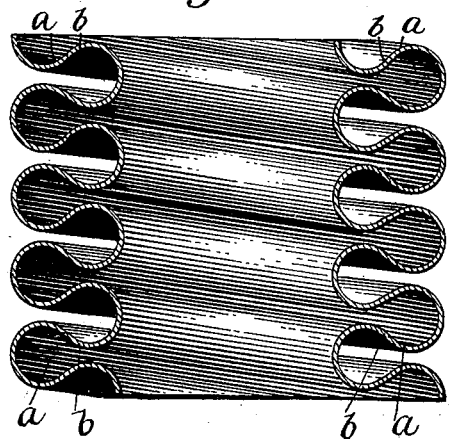
Figure 3:
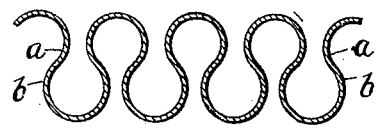
Figure 4:
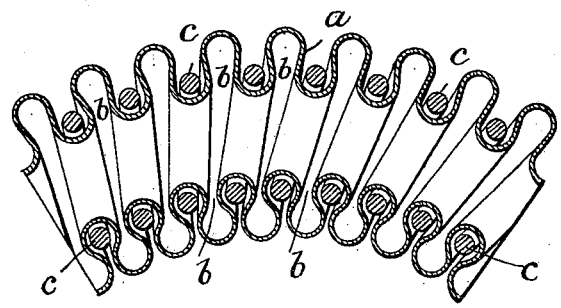

In the drawings, Fig. 1 represents a flexible metallic pipe with parallel rings; Fig. 2, the same wound helically. In both instances the outer bulges are indicated by the letters $a$ $a$, the inner folds by $b$ $b$, and the connecting transverse pieces by $a$ $b$. Fig. 3 illustrates the direct transition from one arc into the other; and Fig. 4 represents a pipe in bent position, into the inner bulge of which a wire $c$ is inserted to increase its strength.

What I claim is—

1. A flexible metal pipe with bulging folds, the set of the metal in its normal condition being such that the cross-section of the wall of the pipe presents outer arcs forming the bulges and inner arcs forming the folds or recesses, the arcs being larger than their normal semicircles, and the ends of the arcs forming the outer folds passing directly into the ends of those forming the inner folds, substantially as described.

2. A flexible metal pipe with bulging folds, the set of the metal in its normal condition being such that the cross-section of the wall of the pipe presents outer arcs forming bulges, and inner arcs forming the folds or recesses, the arcs being larger than their normal semicircles and being connected by transverse pieces oblique to the axis of the pipe, substantially as described.

3. A flexible metal pipe with bulging folds, the set of the metal in its normal condition being such that the cross-section of the wall of the pipe presents outer arcs forming bulges, and inner arcs forming the folds or recesses, the arcs being larger than their normal semicircles and being connected by transverse pieces oblique to the axis of the pipe and having wires within the folds, substantially as described.

In testimony whereof I have signed my name to this specification in the presence of two subscribing witnesses.

SALOMON FRANK.

Witnesses:
FRANZ HASSLACHER,
MICHAEL VOLK.